US009057383B2

(12) United States Patent
Vannini et al.

(10) Patent No.: US 9,057,383 B2
(45) Date of Patent: Jun. 16, 2015

(54) SYSTEMS AND METHODS FOR SWIRL BRAKE TAPERING

(75) Inventors: Giuseppe Vannini, Florence (IT); Lorenzo Naldi, Florence (IT)

(73) Assignee: Nuovo Pignone S.P.A, Florence (IT)

( * ) Notice: Subject to any disclaimer, the term of this patent is extended or adjusted under 35 U.S.C. 154(b) by 788 days.

(21) Appl. No.: 13/332,188

(22) Filed: Dec. 20, 2011

(65) Prior Publication Data

US 2012/0183388 A1 Jul. 19, 2012

(30) Foreign Application Priority Data

Dec. 30, 2010 (IT) .............................. CO2010A0070

(51) Int. Cl.
*F04D 29/08* (2006.01)
*F04D 29/16* (2006.01)
*F04D 29/12* (2006.01)
*F16J 15/447* (2006.01)

(52) U.S. Cl.
CPC ............. *F04D 29/162* (2013.01); *Y10T 29/494* (2015.01); *F04D 29/122* (2013.01); *F16J 15/4472* (2013.01)

(58) Field of Classification Search
CPC .. F04D 29/122; F04D 29/162; F16J 15/4472; Y10T 29/494
USPC .......... 415/170.1, 171.1, 173.7, 174.2, 174.4; 416/174
See application file for complete search history.

(56) References Cited

U.S. PATENT DOCUMENTS

| | | | |
|---|---|---|---|
| 5,161,943 A * | 11/1992 | Maier et al. ................ | 415/170.1 |
| 5,190,440 A | 3/1993 | Maier et al. | |
| 5,320,482 A | 6/1994 | Palmer et al. | |
| 7,775,763 B1 * | 8/2010 | Johnson et al. ............... | 415/111 |
| 8,727,713 B2 * | 5/2014 | Ono et al. .................. | 415/173.6 |
| 2010/0034646 A1 | 2/2010 | Magara et al. | |
| 2014/0205444 A1 * | 7/2014 | Zheng et al. ............... | 415/173.1 |

OTHER PUBLICATIONS

Hendricks et al., Turbomachine Sealing and Secondary Flows Part 2—Review of Rotordynamics Issues in Inherently Unsteady Flow Systems With Small Clearances, Jul. 2004.*
Italian Search Report and Written Opinion dated Aug. 2, 2011 which has been issued in connection with the Italian Patent Application No. CO2010A000070 which was filed on Dec. 30, 2011.
Hendricks R. C. et. al.: Turbomachine Sealing and Secondary Flows Part 2 Review of Rotordynamics Issues in Inherently Unsteady Flow Systems with Small Clearances: Jul. 1, 2004, pp. 1-80, XP007919176.
Dresser-Rand: "Swirl Brakes", Jan. 1, 2003, p. 1, XP007919177.

(Continued)

*Primary Examiner* — Nathaniel Wiehe
*Assistant Examiner* — Woody A Lee, Jr.
(74) *Attorney, Agent, or Firm* — GE Global Patent Operation

(57) ABSTRACT

A centrifugal compressor is disclosed. The centrifugal compressor comprises a first duct configured to receive a process gas, an impeller connected to the first duct and configured to compress the process gas, wherein the impeller has an outer surface, a first seal comprising, a first plurality of swirl brakes configured to have a tooth shape to reduce the inlet seal swirl of a flow of the process gas at an entrance to the first seal, wherein each swirl brake is disposed at a leading edge of the first seal and is configured to have a gap between the first plurality of swirl brakes and the outer surface of the impeller seal. A seal including a plurality of swirl brakes for reducing an inlet swirl and a method of manufacturing such a seal are disclosed.

14 Claims, 8 Drawing Sheets

(56) References Cited

OTHER PUBLICATIONS

URS Baumann: "Rotordynamic Stability Tests on High-Pressure Radial Compressors", Jan. 1, 1999, pp. 114-123, XP007919178.

Sulzer Pumps et. al.: "The heart of your process—Practical Lateral Rotordynamics for <C>entrifugal Pumps", Nov. 1, 2007, pp. 1-52, XP007919179.

Nielsen K K et. al.: "Experimental and Theoretical Comparison of Two Swirl Brake designs", Apr. 1, 2001, vol. 123, pp. 353-358, XP00799180.

Dara Childs: Turbomachinery Rotordynamics: Phenomena, Modeling, and Analysis, New Wiley, US Jan. 1, 1993, pp. 282-284, XP009150883.

\* cited by examiner

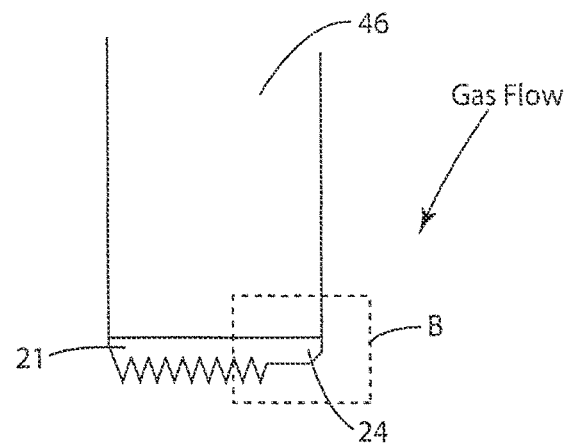
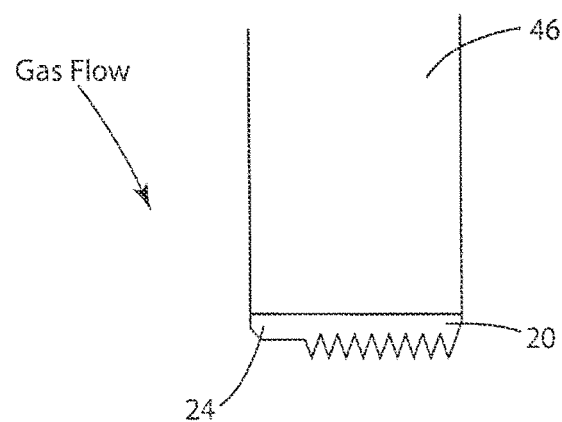

SYSTEMS AND METHODS FOR SWIRL BRAKE TAPERING

BACKGROUND OF THE INVENTION

1. Field of the Invention

Embodiments of the present invention generally relate to compressors and more specifically to seals with swirl brakes.

2. Description of the Prior Art

A compressor is a machine which accelerates the particles of a compressible fluid, e.g., a gas, through the use of mechanical energy to increase the pressure of that compressible fluid. Compressors are used in a number of different applications, including operating as an initial stage of a gas turbine engine. Among the various types of compressors are the so-called centrifugal compressors, in which the mechanical energy operates on gas input to the compressor by way of centrifugal acceleration which accelerates the gas particles, e.g., by rotating a centrifugal impeller through which the gas is passing. More generally, centrifugal compressors are part of a class of machinery known as "turbo machines" or "turbo rotating machines."

Centrifugal compressors can be fitted with a single impeller, i.e., a single stage configuration, or with a plurality of impellers in series, in which case they are frequently referred to as multistage compressors. Each of the stages of a centrifugal compressor typically includes an inlet conduit for gas to be accelerated, an impeller which is capable of providing kinetic energy to the input gas and a diffuser which converts the kinetic energy of the gas leaving the impeller into pressure energy.

In centrifugal compressors there are rotating elements and static elements. Seals can be used between certain rotating and static elements to prevent undesirable leakage within the centrifugal compressor. For example, labyrinth seals or honeycomb seals can be used as internal seals at, for example, a balance piston and an impeller eye (or each impeller eye in a multi-stage centrifugal compressor). Generally, labyrinth seals use grooves and lands to provide a difficult flow path for a fluid, while honeycomb seals use hexagonal shaped cells to resist the flow of the fluid. Both types of seals allow for a small gap (or an equivalent feature) between a rotating surface and a static surface. Various seal designs have been implemented since the inception of turbo machines. These seals can affect leakage and gas swirl. One example of this for use in a compressor, as shown in FIG. 1, is a labyrinth seal 2 with swirl brakes 4 manufactured by Dresser-Rand and seen online at www.dresser-rand.com/literature/services/2035-Swirl-Brake.pdf. This particular design of labyrinth seal 2 with swirl brakes 4 is purported to be used to reduce and reverse the swirl entering the labyrinth seal.

However, another area of interest associated with swirl brakes in centrifugal compressors is rotordynamic stability under various operating conditions. For example, when a part rotates in the seal area, an undesirable circumferential flow can be induced in a chamber of the seal. Entry swirl can also induce undesirable circumferential elements to the flow in the seal, therefore it is desirable to reduce both entry swirl and the effects of rotation in the seal to improve rotordynamic stability in centrifugal compressors.

Accordingly, other systems and methods for seals with swirl brakes for improving rotordynamic stability are desirable.

BRIEF SUMMARY OF THE INVENTION

According to an embodiment of the present invention, a centrifugal compressor is disclosed. The centrifugal compressor comprises a first duct configured to receive a process gas, an impeller connected to the first duct and configured to compress the process gas, wherein the impeller has an outer surface, a first seal comprising, a first plurality of swirl brakes configured to have a tooth shape to reduce the inlet seal swirl of a flow of the process gas at an entrance to the first seal, wherein each swirl brake is disposed at a leading edge of the first seal and is configured to have a gap between the first plurality of swirl brakes and the outer surface of the impeller, wherein each swirl brake has a first surface with a first predetermined length, a second surface connected to the first surface and having a predetermined angle with the first surface, a third surface which extends from an end of the second surface to a beginning of the seal section having a second predetermined length, wherein the third surface has a first taper.

According to another embodiment of the present invention, a seal including a plurality of swirl brakes for reducing an inlet swirl is disclosed. The swirl brakes comprise the plurality of swirl brakes each configured to have a tooth shape which are disposed at a leading edge of a seal and are configured to have a gap between the plurality of swirl brakes and an outer surface of a rotating part, wherein each tooth has a first surface with a first predetermined length, a second surface connected to the first surface and having a predetermined angle with the first surface, a third surface which extends from an end of the second surface to a beginning of the seal section having a second predetermined length, wherein the third surface has a taper.

According to another embodiment of the present invention, a method of manufacturing a seal including a plurality of swirl brakes for use in reducing an inlet seal swirl in a centrifugal compressor is disclosed. The method comprises procuring the seal of interest, machining the plurality of swirl brakes to each have a tooth shape on the seal leading edge, machining a first surface of a swirl brake with a first predetermined length for each swirl brake, machining a second surface of the teeth connected to the first surface having a predetermined angle with the first surface for each tooth; and machining a third surface of the teeth which extends from an end of the second surface to a beginning of a seal section having a second predetermined length for each tooth, wherein the third surface has a first taper configured to reduce an inlet seal swirl.

BRIEF DESCRIPTION OF THE SEVERAL VIEWS OF THE DRAWINGS

The accompanying drawings illustrate exemplary embodiments, wherein:

FIG. 7 illustrates a seal and a swirl brake in a first orientation according to exemplary embodiments of the present invention;

FIG. 8 shows a seal and a swirl brake in a second orientation according to exemplary embodiments of the present invention;

DETAILED DESCRIPTION OF THE INVENTION

The following detailed description of the exemplary embodiments refers to the accompanying drawings. The same reference numbers in different drawings identify the same or similar elements. Additionally, the drawings are not necessarily drawn to scale. Also, the following detailed description does not limit the invention. Instead, the scope of the invention is defined by the appended claims.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

According to exemplary embodiments, seals with swirl brakes can be manufactured and installed to improve rotordynamic stability. The improvement is created by the swirl brakes driving inlet seal entry swirl to substantially zero. This can reduce the amount of undesirable circumferential forces in the seal during operation of centrifugal compressors.

Figure 1:
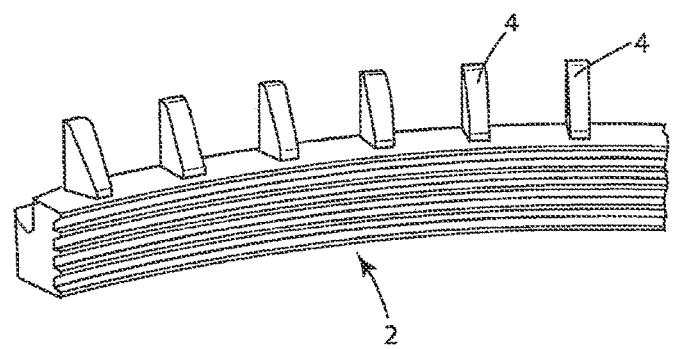
FIG. 1 depicts a labyrinth seal with a swirl brake.
Figure 2:
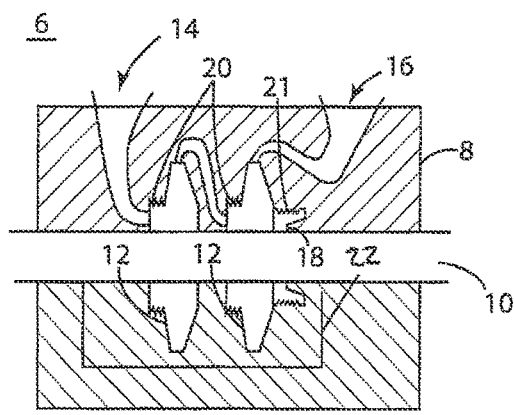
FIG. 2 illustrates a multi-stage centrifugal compressor according to exemplary embodiments of the present invention.

To provide some context for the subsequent discussion relating to seals with swirl brakes according to these exemplary embodiments, FIG. 2 illustrates a multi-stage, centrifugal compressor 6 in which such seals with swirl brakes may be employed. Therein, the centrifugal compressor 6 includes a housing 8 within which is mounted a rotating compressor shaft 10 that is provided with a plurality of centrifugal impellers 12. The centrifugal compressor 6 takes an input process gas from duct inlet 14, accelerates the particles of the process gas through operation of the impellers 12, and subsequently delivers the process gas through outlet duct 16 at an output pressure which is higher than its input pressure. The process gas may, for example, be any one of carbon dioxide, hydrogen sulfide, butane, methane, ethane, propane, liquefied natural gas, or a combination thereof. A balance piston 18 (also known as a balance drum) is also shown. The balance piston is used to compensate for axial thrust generated by the impellers 12. Seals 20 and 21, e.g., labyrinth and/or honeycomb seals, are used to prevent leakage and to maintain pressure. Additionally, a balance line 22 is shown. The balance line maintains pressure on the outboard side of the balance piston 18 at the same level as the pressure at which the process gas enters via duct 14.

Figure 3:
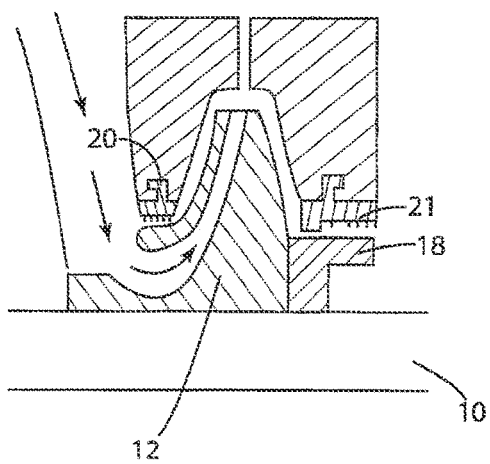
FIG. 3 shows a final impeller stage and a balance piston within the multi-stage centrifugal compressor according to exemplary embodiments of the present invention.

FIG. 3 shows an exploded view of the last impeller 12 in contact with the balance piston 18. The arrows show the primary flow direction of the process gas used in the centrifugal compressor 6. Seals 20 and 21 prevent (or greatly reduce the amount of) leakage from a higher pressure side to a lower pressure side of the process gas. Additionally, according to exemplary embodiments, the seals 20 and 21 can include swirl brakes (described below in more detail) which can reduce swirl of the flow, e.g., drive the value of swirl towards zero, and improve the rotordynamics of compressor 6.

Figure 4:
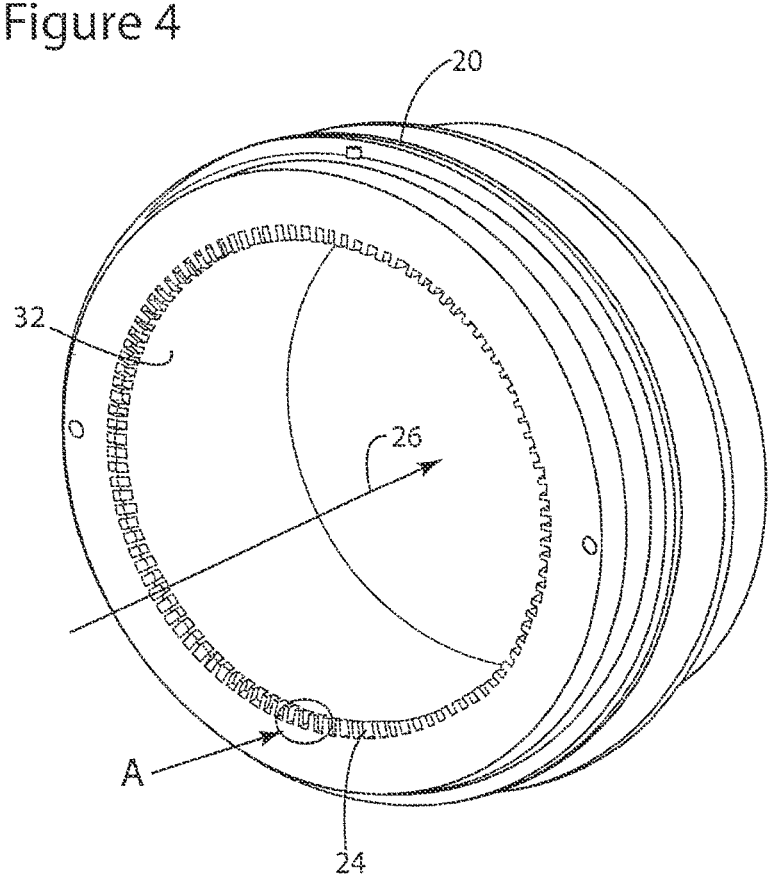
FIG. 4 illustrates a labyrinth seal with a plurality of swirl brakes prior to final shaping according to exemplary embodiments of the present invention.
Figure 5:
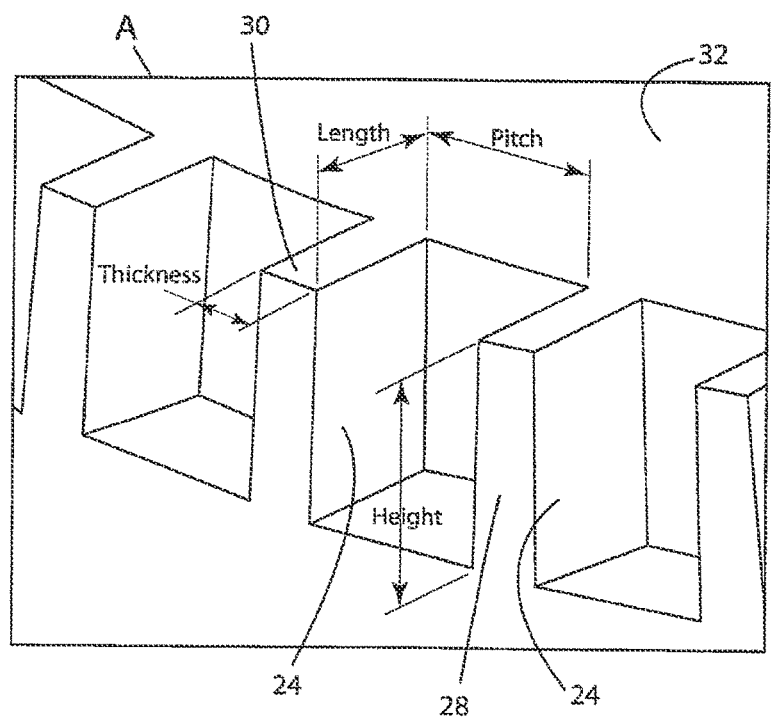
FIG. 5 shows a plurality of tooth shaped swirl brakes prior to final shaping according to exemplary embodiments of the present invention.

According to exemplary embodiments, seal 20 (and seal 21) can include swirl brakes 24 as shown in FIGS. 4 and 5. The swirl brakes 24 shown in FIGS. 4 and 5 are tooth shaped and can be machined from the base stock material of the seal 20. FIG. 5 shows the exploded section A from FIG. 4. The plurality of swirl brakes 24 shown in FIG. 5 are shown in a basic tooth form prior to being machined to desired final dimensions which are described, according to exemplary embodiments, in more detail below. Arrow 26 represents a longitudinal axis of the seal 20 and area 32 represents the portion of seal 20 that can be a labyrinth, a honeycomb or a pocket damper seal section. For reference, the labels of pitch, length, thickness and height for the swirl brakes 24 are shown in FIG. 5. When considering the direction of flow of the process gas, the main flow will occur roughly parallel to surface 28. The flow of gas that is to be minimized, e.g., blocked between the higher and lower pressure zones, will occur roughly parallel to surface 30.

Figure 6:
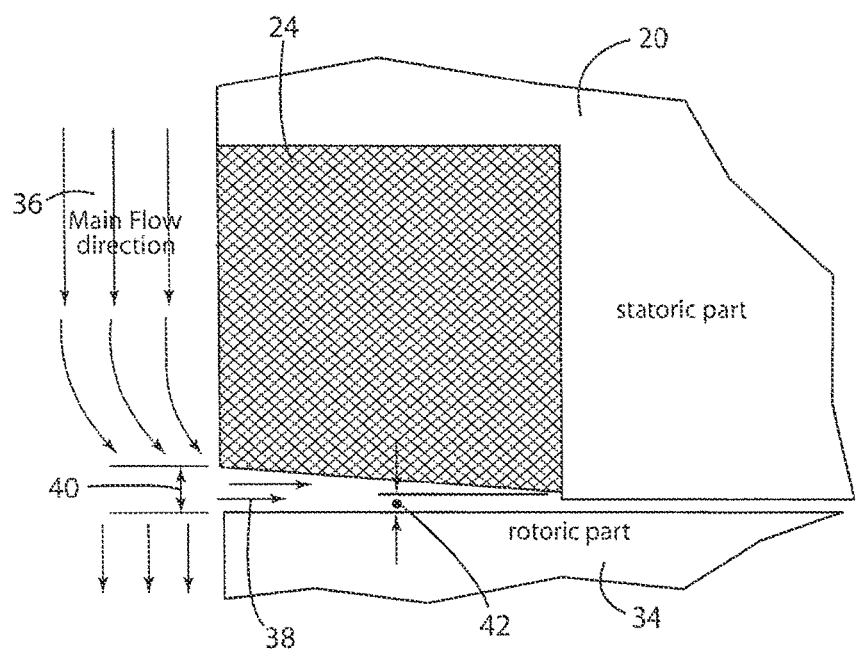
FIG. 6 illustrates a schematic of a gap between a statoric part and a rotoric part according to exemplary embodiments of the present invention.

According to exemplary embodiments, the tooth shaped swirl brakes 24 can be tapered as shown in FIG. 6. FIG. 6 shows the statoric part, e.g., seal 20, the rotoric part 34, e.g., the impeller 12 or the balance piston 18, the main flow direction 36 for the process gas, the attempted flow path 38 through the seal, a leading edge clearance 40 and a trailing edge clearance 42 between the statoric part and the rotating part. The leading edge clearance 40 is larger than the trailing edge clearance 42. Additionally, the leading edge clearance 40 is larger, relatively, than the clearance found in conventional swirl brakes where it has typically been believed that increasing the upstream clearance 40 deteriorates swirl control. According to an exemplary embodiment, the leading edge clearance 40 can be approximately double the trailing edge clearance 42, however other values of the clearances could be used. While the rotoric part 34 can be either the impeller 12 or the balance piston 18, in FIG. 6 the rotoric part 34 is the impeller 12. For the case of the balance piston 18 being the rotoric part 34, would have an opposite orientation from the orientation shown in FIG. 6 as can be seen from seals 20 and 21 in FIG. 3.

According to exemplary embodiments, the swirl brakes 24 can be machined to reduce swirl and improve rotordynamic efficiency. FIGS. 7 and 8 show a diaphragm 46 attached to the seals 20 and 21 which includes the swirl brake 24. The two different orientations shown in FIGS. 7 and 8 correspond to the orientations of the seals 20 and 21 in FIG. 3. An expanded view of the swirl brake 24 shown as section B in FIG. 7 is shown in FIG. 9 and will now be explained.

Figure 9:
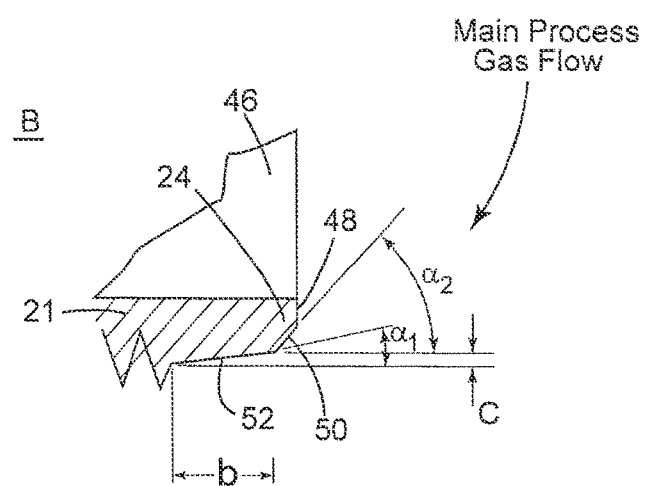
FIG. 9 depicts a shape of a swirl brake according to exemplary embodiments of the present invention.

According to exemplary embodiments, the swirl brakes 24 can be machined to have a shape as shown in FIG. 9. Each swirl brake 24 can have a first machined surface 48, a second machined surface 50 and a third machined surface 52. The first surface 48 is a portion of surface 28 shown in FIG. 5. The third surface 52 is a portion of surface 30 as shown in FIG. 5. The third surface can have a predetermined taper over its predetermined length b, with a predetermined height change c. According to exemplary embodiments, the predetermined height change c of the taper can be in the range of 0-0.1 mm, however other height change ranges can be used. The angle of the taper is shown as $\alpha_1$. The second surface 50 connects the first surface 48 to the third surface 52, and the second surface has an angle of $\alpha_2$. According to exemplary embodiments, the tooth structure can provide the rotordynamic efficiency improvements under a complete range of operating conditions for centrifugal compressors.

According to another exemplary embodiments, similar tooth shaped swirl brakes 24, as shown in FIG. 9 and described above, can be used in various centrifugal compressors. The dimensions of the surfaces, e.g., surfaces 48, 50 and 52, as well as the values of the angles $\alpha_1$ and $\alpha_2$ can vary depending upon the characteristics of the centrifugal compressor, its operating conditions in order to still obtain a minimized or zero inlet swirl amount, etc.

Figure 10:
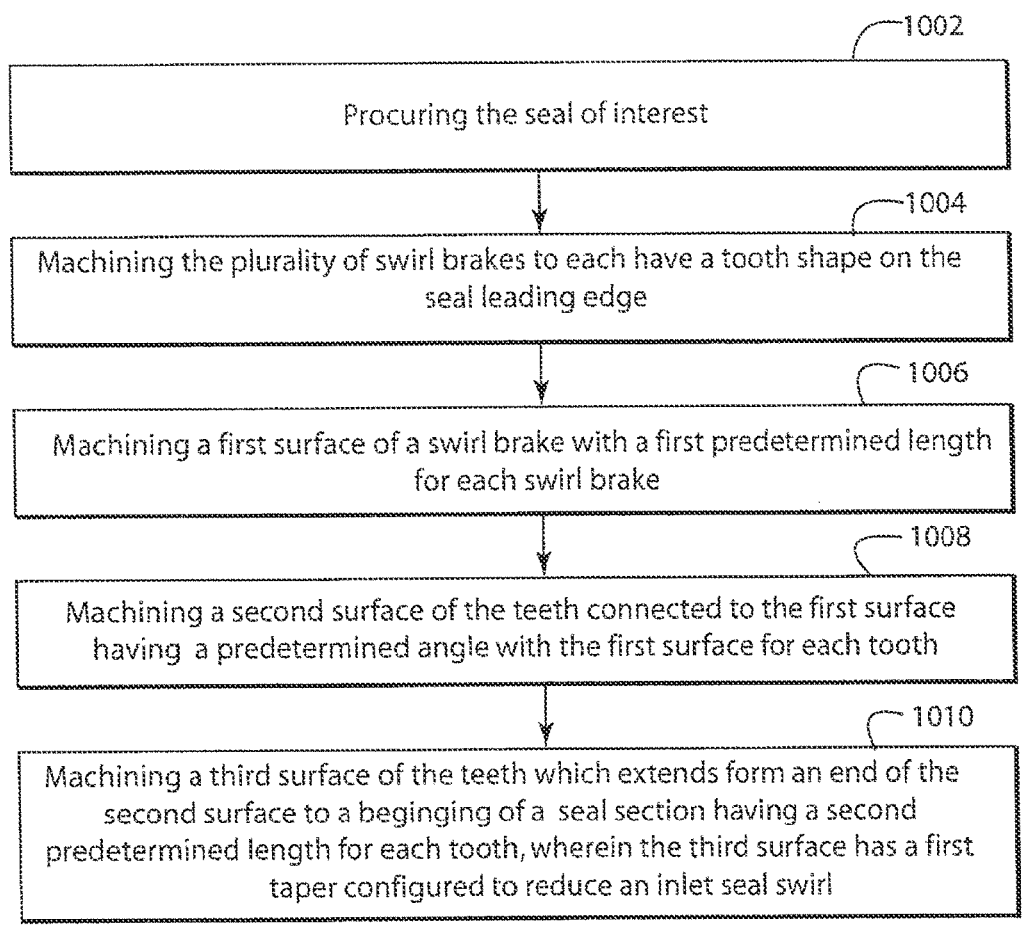
FIG. 10 is a flowchart showing a method of manufacturing a seal including a plurality of swirl brakes for use in reducing an inlet seal swirl in a centrifugal compressor according to exemplary embodiments of the present invention.

Utilizing the above-described exemplary systems according to exemplary embodiments, a method for manufacturing a seal including a plurality of swirl brakes for use in reducing an inlet seal swirl in a centrifugal compressor is shown in the flowchart of FIG. 10. The method includes: a step 1002 of procuring the seal of interest; a step 1004 of machining the plurality of swirl brakes to each have a tooth shape on the seal leading edge; a step 1006 of machining a first surface of a swirl brake with a first predetermined length for each swirl brake; a step 1008 of machining a second surface of the teeth connected to the first surface having a predetermined angle with the first surface for each tooth; and a step 1010 of machining a third surface of the teeth which extends from an end of the second surface to a beginning of a seal section having a second predetermined length for each tooth, wherein the third surface has a first taper configured to reduce an inlet seal swirl.

The above-described exemplary embodiments are intended to be illustrative in all respects, rather than restrictive, of the present invention. Thus the present invention is capable of many variations in detailed implementation that can be derived from the description contained herein by a person skilled in the art. All such variations and modifications are considered to be within the scope and spirit of the present invention as defined by the following claims. For example, the centrifugal compressor can be a single stage compressor or a multistage compressor. No element, act, or instruction used in the description of the present application should be construed as critical or essential to the invention unless explicitly described as such. Also, as used herein, the article "a" is intended to include one or more items.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A centrifugal compressor comprising:
a first duct configured to receive a process gas;
an impeller connected to the first duct and configured to compress the process gas, wherein the impeller has an outer surface;
a first seal comprising:
a first plurality of swirl brakes configured to have a tooth to reduce the inlet seal swirl of a flow of the process gas at an entrance to the first seal;
wherein each swirl brake is disposed at a leading edge of the first seal and is configured to have a gap between the first plurality of swirl brakes and the outer surface of the impeller, wherein each swirl brake comprises:
a first surface with a first predetermined length;
a second surface connected to the first surface and having a predetermined angle with the first surface;
a third surface which extends from an end of the second surface to a beginning of the seal section having a second predetermined length, wherein the third surface has a non-zero first taper.

2. The centrifugal compressor of claim 1, further comprising:
a balance piston configured to reduce an axial thrust in the centrifugal compressor;
a second seal comprising;
a second plurality of swirl brakes configured to have a tooth to reduce swirl of a flow of the process gas at an entrance to the second seal.

3. The centrifugal compressor of claim 1, wherein the taper has a height change that is greater than 0 and less than or equal to 1 mm over the second predetermined length and the ratio between the leading edge clearance to the trailing edge clearance is substantially two.

4. A swirl brake for reducing an inlet swirl, the swirl break being integral with a seal, the swirl brake comprising:
a tooth disposed at a leading edge of a seal and are configured to have a gap between the plurality of swirl brakes and an outer surface of a rotating part; wherein each tooth has a first surface with a first predetermined length;
a second surface connected to the first surface and having a predetermined angle with the first surface; and
a third surface which extends from an end of the second surface to a beginning of the seal section having a second predetermined length, wherein the third surface has a non-zero taper.

5. The swirl brake of claim 4, wherein the taper has a height change that is greater than 0 and less than or equal to 1 mm over the second predetermined length and the ratio between the leading edge clearance to the trailing edge clearance is substantially two.

6. The swirl brake of claim 4, wherein the seal is one of a labyrinth seal, a honeycomb seal or a pocket damper seal.

7. The swirl brake of claim 4, wherein the seal is disposed at an impeller eye.

8. The swirl brake of claim 4, wherein the seal is disposed at a balance piston.

9. A method of manufacturing a seal comprising a plurality of swirl brakes for use in reducing an inlet seal swirl in a centrifugal compressor, the method comprising:
procuring the seal of interest;
machining the plurality of swirl brakes to each have a tooth on the seal leading edge;
machining a first surface of a swirl brake with a first predetermined length for each swirl brake;
machining a second surface of the tooth connected to the first surface, the second surface having a predetermined angle in relation the first surface for each tooth; and
machining a third surface of the tooth, the third surface of the tooth extending from an end of the second surface to a beginning of a seal section having a second predetermined length for each tooth, wherein the third surface has a first non-zero taper configured to reduce an inlet seal swirl.

10. The method of claim 9, further comprising:
machining a second taper on the third surface such that the swirl brake is configured for assembly in a compressor.

11. The method of claim 9, wherein the taper has a height change that is greater than 0 and less than or equal to 1 mm over the second predetermined length and the ratio between the leading edge clearance to the trailing edge clearance is substantially two.

12. The method of claim 9, wherein the seal is one of a labyrinth seal, a honeycomb seal or a pocket damper seal.

13. The method of claim of 9, wherein the seal is disposed at an impeller eye.

14. The method of claim 9, wherein the seal is disposed at a balance piston.

* * * * *